United States Patent
Bienz et al.

(10) Patent No.: US 6,656,010 B1
(45) Date of Patent: Dec. 2, 2003

(54) CHILDREN'S RIDE-ON VEHICLE

(75) Inventors: Brian L. Bienz, West Seneca, NY (US); Karl D. Lerch, East Aurora, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/665,195

(22) Filed: Sep. 18, 2000

Related U.S. Application Data

(63) Continuation-in-part of application No. 09/245,579, filed on Feb. 5, 1999, now Pat. No. 6,120,345.

(51) Int. Cl.[7] ............................................. A63H 17/00
(52) U.S. Cl. ...................... 446/431; 446/440; 180/65.1
(58) Field of Search ................. 446/431, 440; 180/65.1, 65.6, 65.8, 60.6, 215, 216, 209, 21, 908, 220, 315; 318/111, 112, 113; 286/282, 280; 307/119

(56) References Cited

U.S. PATENT DOCUMENTS

| | | | |
|---|---|---|---|
| 1,262,806 A | | 4/1918 | Kemble |
| 1,571,489 A | | 2/1926 | Morihata |
| 2,054,842 A | | 9/1936 | Walker |
| 2,419,178 A | * | 4/1947 | Strong |
| 2,485,770 A | | 10/1949 | Place |
| 3,166,141 A | | 1/1965 | Shields et al. |
| 3,416,625 A | | 12/1968 | Narutani |
| 3,732,671 A | * | 5/1973 | Allen et al. |
| 3,828,876 A | | 8/1974 | Morelli |
| 3,842,928 A | * | 10/1974 | Kishi ........................ 180/26 R |
| 3,917,270 A | | 11/1975 | Gothard, Jr. et al. |
| 4,087,107 A | | 5/1978 | Winchell |
| 4,313,511 A | | 2/1982 | Soo Hoo |
| 4,399,883 A | | 8/1983 | Todokoro |
| 4,484,646 A | | 11/1984 | Smith |
| 4,494,763 A | | 1/1985 | Whitehead |
| 4,498,887 A | | 2/1985 | Cook |
| 4,516,648 A | * | 5/1985 | Berger et al. ............... 180/6.66 |
| 4,558,263 A | * | 12/1985 | Harris et al. ................. 318/139 |
| 4,562,893 A | * | 1/1986 | Cunard ........................ 180/6.5 |
| 4,736,648 A | * | 4/1988 | Perego ........................ 74/474 |
| 4,739,851 A | | 4/1988 | Perego |
| 4,775,021 A | | 10/1988 | Marino |
| 5,439,071 A | * | 8/1995 | Rodriguez-Ferre .......... 180/167 |
| 5,533,899 A | | 7/1996 | Young |
| 5,644,114 A | * | 7/1997 | Neaves ....................... 200/6 R |
| 5,765,871 A | | 6/1998 | Wyman et al. |
| 5,845,724 A | | 12/1998 | Barrett |
| 5,859,509 A | * | 1/1999 | Bienz et al. ................. 318/139 |
| 5,947,739 A | | 9/1999 | Lenihan |
| 6,120,345 A | * | 9/2000 | Lenihan et al. ............. 446/431 |
| 6,155,833 A | * | 12/2000 | Lenihan ........................ 434/29 |
| 6,345,676 B1 | * | 2/2002 | Huntsberger et al. ...... 180/65.1 |
| 6,405,817 B1 | * | 6/2002 | Huntsberger et al. ...... 180/65.1 |

OTHER PUBLICATIONS

Amazon.com, Please see attachments.*

* cited by examiner

Primary Examiner—Derris H. Banks
Assistant Examiner—Jamila Williams
(74) Attorney, Agent, or Firm—Kolisch Hartwell, P.C.

(57) ABSTRACT

A children's ride-on vehicle. The ride-on includes a frame adapted to support a child, and a drive assembly with a battery-powered motor assembly. The ride-on further includes one or more steerable wheel and one or more driven wheel. In some embodiments, the ride-on resembles a full-size motorcycle. In some embodiments, the ride-on includes a free-floating wheel, which is unbiased and travels within a defined range of positions with respect to the ride-on's frame as external forces are imparted to the wheel. In some embodiments, the ride-on includes a high-speed switch positioned for momentary high-speed travel of the vehicle.

34 Claims, 6 Drawing Sheets

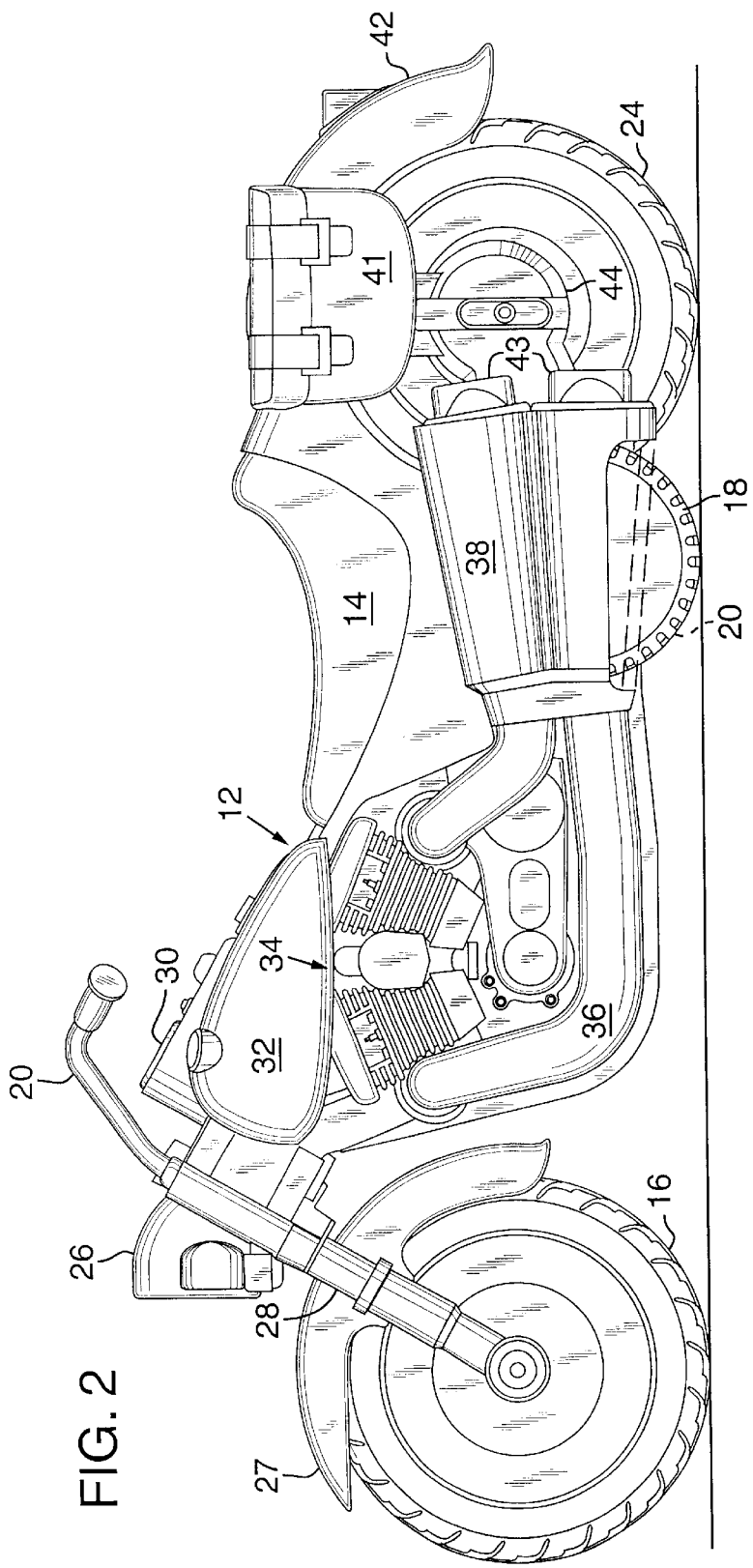

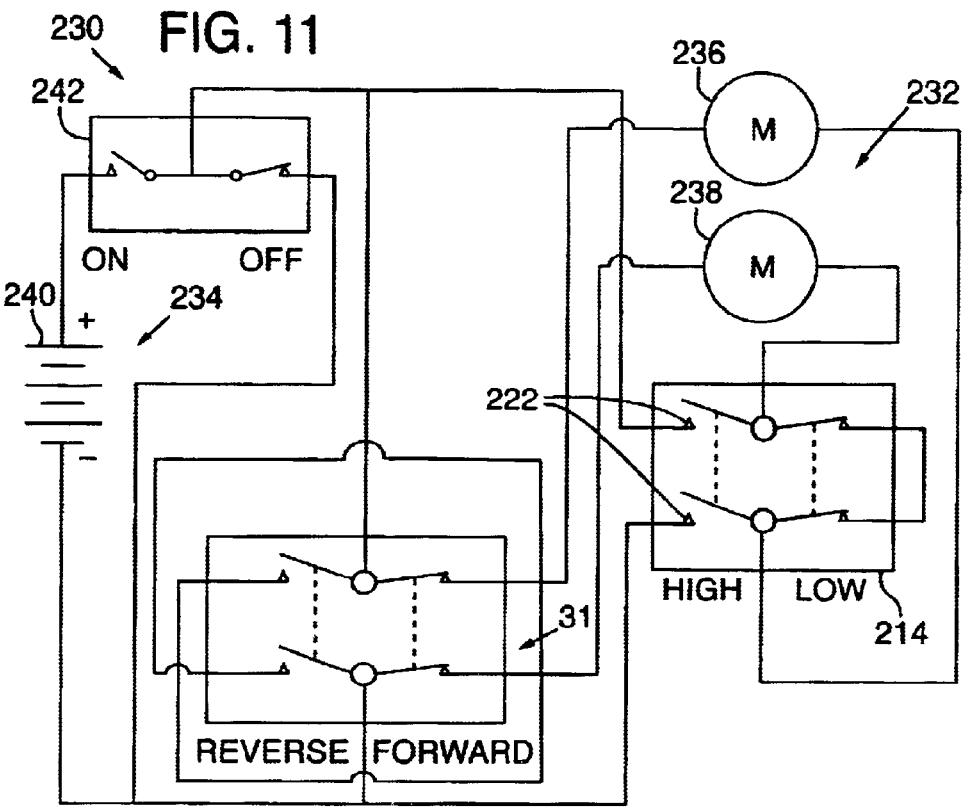
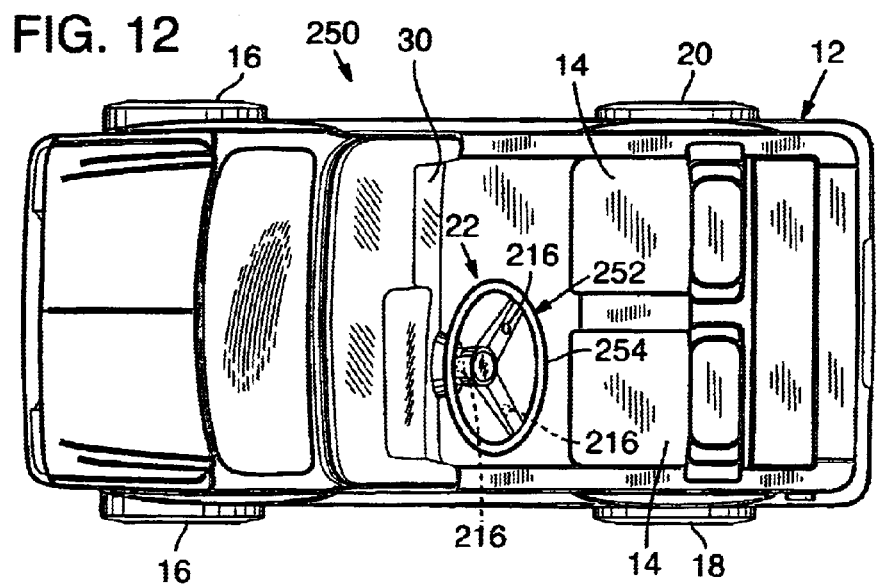

CHILDREN'S RIDE-ON VEHICLE

RELATED APPLICATION

This is a continuation-in-part application of U.S. patent application Ser. No. 09/245,579, which was filed on Feb. 5, 1999, is entitled, "Ride-On Vehicle with a Free Floating Wheel," now U.S. Pat. No. 6,120,345 and the disclosure of which is hereby incorporated by reference.

FIELD OF THE INVENTION

The invention relates generally to children's ride-on vehicles.

BACKGROUND AND SUMMARY OF THE INVENTION

Ride-on vehicles for children have become increasingly popular due in part to the desire of children to drive self-propelled vehicles resembling full-size vehicles. Such ride-on vehicles, or ride-ons, are typically propelled by battery-powered motors and generally include scaled-down features of full-size vehicles.

One challenge in designing reduced-scale vehicles is to make the vehicle resemble a full-size vehicle, while still providing a vehicle that is safe for use by children. When a ride-on is designed to resemble a four-wheeled vehicle, such as a car or truck, the corresponding ride-on tends to also have four wheels. When a ride-on is designed to resemble a motorcycle, however, a balance must be reached between safety and the accuracy of the reproduction. Certainly the most accurate reproduction is for the ride-on to only have two wheels. However, children may not have the size, strength or coordination to balance a two wheeled ride-on, especially when propelled by the ride-on's motor. Adding additional wheels to the ride-on detracts from the accuracy of the reproduction, and thus may reduce the child's desire for the ride-on.

The invented ride-on, or ride-on vehicle, includes a frame adapted to support a child, and a drive assembly with a battery-powered motor assembly. The ride-on further includes one or more steerable wheel and one or more driven wheel. In some embodiments, the ride-on resembles a full-size motorcycle. In some embodiments, the ride-on includes a free-floating wheel, which is unbiased and travels within a defined range of positions with respect to the ride-on's frame as external forces are imparted to the wheel. In some embodiments, the ride-on includes a high-speed switch positioned for momentary high-speed operation of the vehicle.

BRIEF DESCRIPTION OF THE DRAWINGS

FIG. 2 is a side elevation view of the ride-on of FIG. 1.

FIG. 11 is a schematic wiring diagram.

FIG. 12 is a top plan view showing another embodiment of a ride-on vehicle according to the present invention.

DETAILED DESCRIPTION OF THE PREFERRED EMBODIMENTS AND BEST MODE OF THE INVENTION

Figure 1:
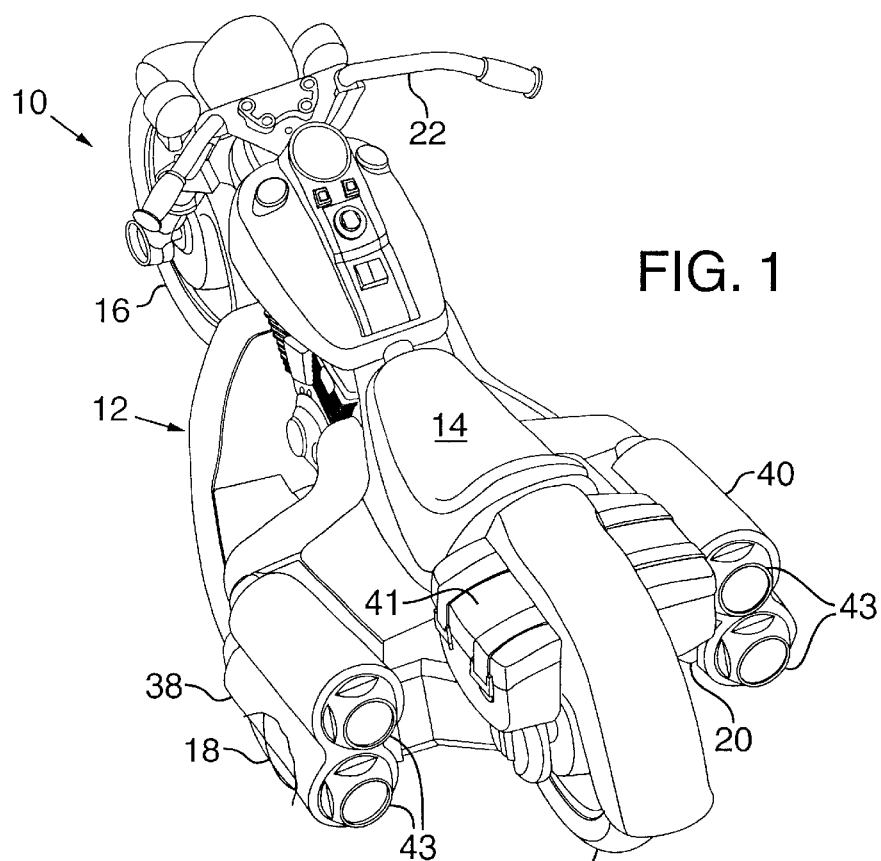
FIG. 1 is an isometric view of a children's ride-on constructed according to the present invention, with a portion of the ride-on's frame broken away to expose a drive wheel.

A children's ride-on constructed according to the present invention is shown in FIG. 1 and generally indicated at 10. Ride-on 10 includes a frame, or vehicle body, 12 with a seat 14, a forward wheel 16, drive wheels 18 and 20, a steering mechanism 22, and a rear wheel 24.

As shown, ride-on 10 generally resembles a reduced-scale motorcycle, and more particularly a reduced-scale Harley-Davidson® motorcycle. It should be understood that ride-on 10 may be shaped to resemble other motorcycles and two-wheeled vehicles. Frame 12 typically is formed from molded plastic parts that are secured together by screws or other suitable fasteners. As shown in FIG. 2, frame 12 is shaped to resemble components of a conventional motorcycle, including a head light 26, front fender and struts 27 and 28, dash board 30, gas tank 32, engine 34, foot boards 36, exhaust pipes 38 and 40 (shown in FIG. 1), saddle bag 41, rear fender 42, tail lights 43 and swing arms 44 and 45 (shown in FIG. 5). Frame 12 also houses the vehicle's electrically powered motor assembly, battery assembly, and electrical and mechanical interconnections (not shown). It should be understood that the motor and battery assemblies each may include one or more motors or batteries, respectively. It should be understood that the shape and configuration of the frame will vary depending on the particular model and style of motorcycle that ride-on 10 is designed to resemble.

It is within the scope of the present invention that the ride-on may resemble other types of full-sized vehicles, such as cars, trucks, off-road vehicles, construction equipment, aircraft, seacraft and the like. Similarly, the ride-on may have a unique body shape or configuration that is designed to appeal to children and which does not necessarily resemble a reduced-scale version of a conventional full-sized vehicle.

In the embodiment of the ride-on shown in FIGS. 1 and 2, it can be seen that drive wheels 18 and 20 are substantially housed within the portions of frame 12 forming exhaust pipes 38 and 40. By "drive wheel" or "driven wheel" it is meant that the rotational output of the ride-on's motor assembly drives the rotation of the wheel about, or with, its axle or other mount. This is compared to a non-driven wheel, which rotates in the direction of movement of the ride-on, but is not directly coupled to the rotational output of the ride-on's motor assembly.

Because its drive (also referred to as driven) wheels are substantially hidden from view, ride-on 10 has the appearance of a two-wheeled motorcycle, even though it has at least three wheels supporting the frame in a stable operating position. In fact, in FIG. 1 it can be seen that a portion of the frame forming exhaust pipe 38 had to be broken away to reveal drive wheel 18. Similarly, drive wheel 20 is almost completely hidden from view by "exhaust pipe" 40. In FIG. 2, it can be seen that the lower portion of exhaust pipe 38 is removed to provide additional clearance for drive wheel 18. It is within the scope of the present invention that the exhaust pipes may have less of their lower portions removed, such as shown in dashed lines in FIG. 2. Furthermore, although a pair of driven wheels are shown in FIGS. 1 and 2, it is within the scope of the invention that more or less driven wheels may be used, either alone or in combination with one or more additional non-driven wheels.

Because ride-on vehicles are often used by young children who may not have the strength, size and/or coordination to balance a two-wheeled vehicle, ride-on 10 provides at least three spaced-apart supports that stabilize the ride-on. More specifically, front wheel 16 and drive wheels 18 and 20 form a tricycle. However, by hiding the drive wheels within the frame, ride-on 10 enables the child to feel and look like it is riding a two-wheeled motorcycle.

Figure 3:
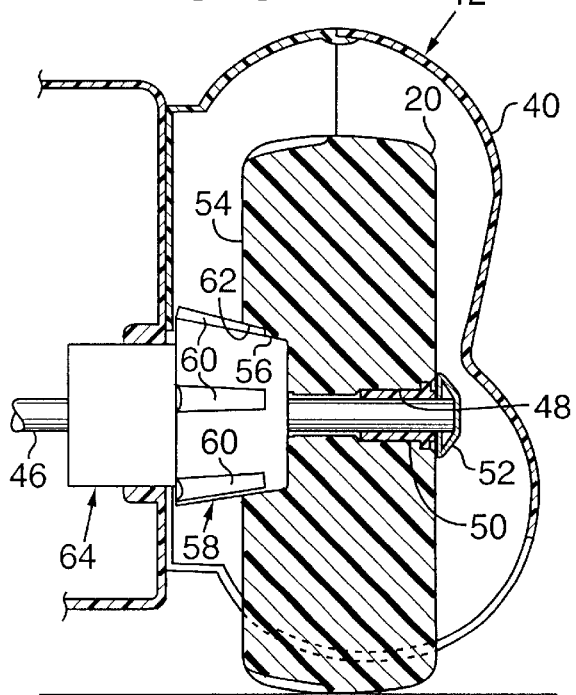
FIG. 3 is a cross-sectional view of one of the drive wheels shown in FIG. 1.
Figure 4:
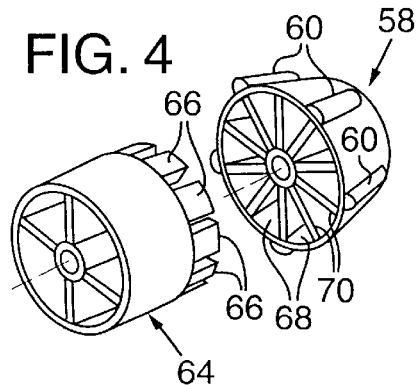
FIG. 4 is an exploded isometric view of the wheel bearing and gear shown in FIG. 3.

In FIG. 3, the interconnection between drive wheel 20 and the ride-on's motor assembly is shown. It should be understood that drive wheel 18 is coupled to the motor assembly with a similar set of interconnections. As shown, an axle 46 extends through wheel 20, which includes an outer recess 48 into which an axle bushing 50 is seated. Axle 46 passes through bushing 50, and wheel 20 is retained on the axle by a cap nut 52 or other suitable fastener. Wheel 20 includes an inner face 54 that includes a recess 56 within which a wheel bearing 58 is received. Bearing 58 is rotatably mounted on axle 46 and includes plural outer ribs 60 that extend radially outward from axle 46. Outer ribs 60 are received within corresponding channels 62 in recess 56. Once seated therein, wheel 20 rotates when bearing 58 is rotated about, or with, axle 46.

Wheel bearing 58 is rotated by a gear 64, which is driven by the ride-on's motor assembly (not shown) through any suitable mechanical interconnection, as is known in the art. Gear 64 is seated on axle 46 and includes plural teeth 66 that extend into cavities 68 formed by internal ribs 70 within bearing 58. Closing an electrical circuit between the ride-on's battery assembly and its motor assembly imparts an angular velocity to gear 64, which in turn directs the rotation of bearing 58 and drive wheel 20 by the engagement of teeth 66 and internal ribs 70. Because bearing 58 is interlocked with drive wheel 20, the rotation of bearing 58 also causes wheel 20 to rotate, thereby propelling the ride-on in the selected direction.

The circuit described above typically is opened and closed by a switch, which is mounted on the frame in a position where it may be operated by the child. Examples of suitable switches are pedals on one of the ride-on's foot boards 36, a throttle switch on steering mechanism (i.e. handle bars) 22, or a switch on dash board 30. The ride-on's controls may include a reversing switch 31 to enable the child to selectively change the direction of revolution of the above components, and thereby change the direction of travel of ride-on 10.

Unlike drive wheels 18 and 20, which are used to propel ride-on 10, or front wheel 16, which is oriented by steering mechanism 22 to steer the ride-on, rear wheel 24 just goes along for the ride. By this it is meant that wheel 24 is neither driven nor steerable. Instead, it is a free-spinning wheel that freely rotates and travels along a defined path as external forces are imparted upon it. By external forces, it is meant forces that originate from external ride-on 10 and which are imparted directly or indirectly to rear wheel 24. Examples of external forces are gravity and bumps or shocks causes by ride-on 10 traveling over uneven terrain. Wheel 24 may also be described as being free from internal vertical bias when within its defined range of positions because ride-on 10 does not include any spring, lever arm or other biasing mechanism to urge wheel 24 to a particular position. As such, wheel 24 is neither biased nor otherwise loaded to remain in a particular position or orientation with respect to the rest of ride-on 10. Wheel 24 may also be described as traveling or floating within a defined range of positions to adjust freely to changes in elevation in the surface over which ride-on 10 travels.

Figure 5:
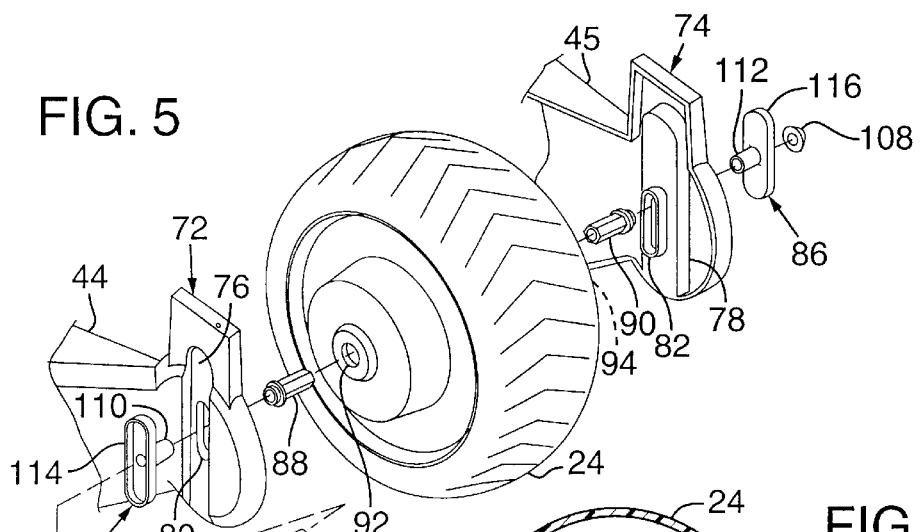
FIG. 5 is an exploded isometric view of the free-floating rear wheel shown in FIG. 4.
Figure 6:
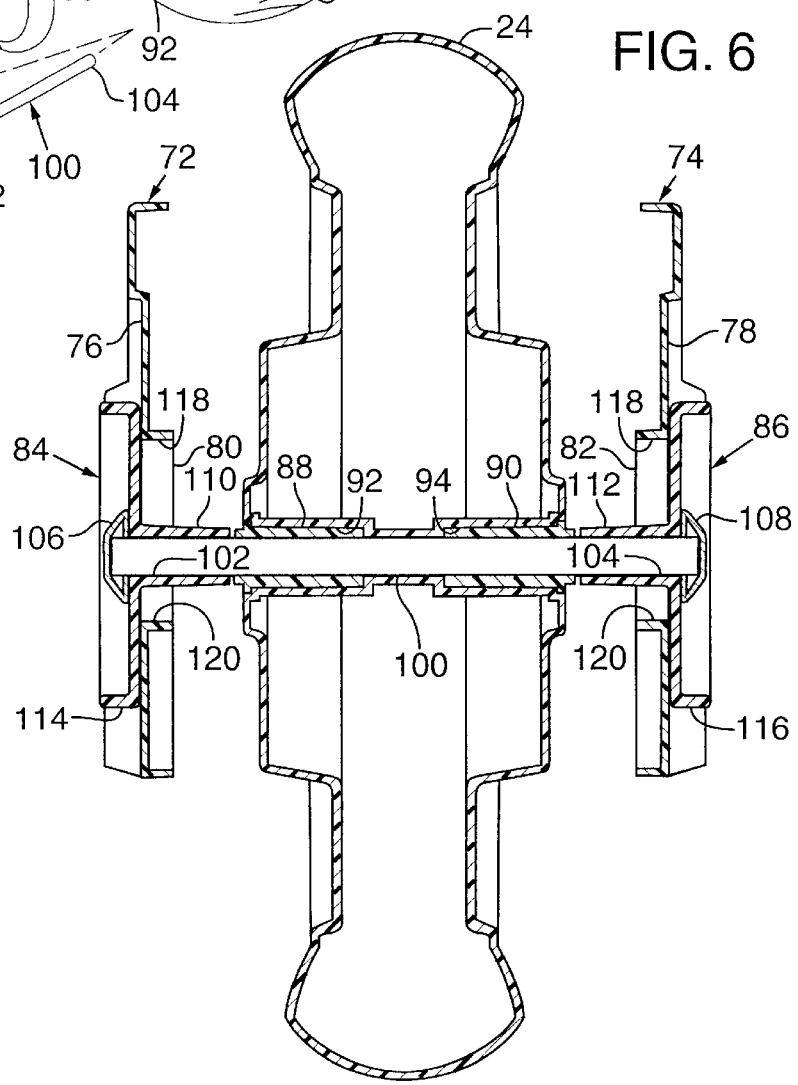
FIG. 6 is a cross-sectional view of the wheel of FIG. 5.

As shown in FIGS. 5 and 6, the portions of frame 12 which form the ride-on's "swing arms" 44 and 45 are in fact spaced-apart mounts 72 and 74 between which wheel 24 is rotatably mounted. Mounts 72 and 74 are fixed in place relative to the rest of frame 12, and includes regions 76 and 78 that form a track with vertical channels 80 and 82. As discussed subsequently, channels 80 and 82 cooperate with axle bearings 84 and 86 to define a race or vertical range through which wheel 24 may travel as external forces are applied to the wheel.

As perhaps best seen in FIG. 5, wheel 24 includes a pair of bushings 88 and 90 that are inserted into a corresponding pair of receptacles 92 and 94, one on each side of wheel 24. As shown, the portions of bushings 88 and 90 which are inserted within the receptacles are generally hex-shaped. Receptacles 92 and 94 have a similar shape, thereby enabling wheel 24 to rotate as bushings 88 and 90 rotate. It should be understood that configurations other than the hex-shaped configuration shown in FIG. 5 may be used.

An axle 100 passes through wheel 24 and bushings 88 and 90 to provide an axis about which wheel 24 may rotate. Axle 100 includes a pair of ends 102 and 104, which each are passed through a respective one of channels 80 and 82 and axle bearings 84 and 86. A pair of cap nuts or other suitable fasteners 106 and 108 are mounted on the ends of axle 100. Fasteners 106 and 108 secure the axle bearings, mounts, and wheel together with only a small amount of side-to-side play, while still allowing bushings 88 and 90, and thus wheel 24, to rotate on the axle.

As discussed, channels 80 and 82 define a vertical range of positions within which axle bearings 84 and 86 are free to travel. As shown, channels 80 and 82 each have an oval, or racetrack-shaped opening, through which a stem portion 110 and 112 of one of the axle bearings extends. While the stem portions extend through the bearings, the head portions 114 and 116 of each axle bearing slide up and down the track defined by regions 76 and 78. Movement of axle bearings 84 and 86 up and down in response to uneven terrain is limited by top 118 and bottom 120 limits of channels 80 and 82, which are indicated in FIG. 6.

From a nominal position on level terrain, wheel 24 can move up approximately 0.4 inches and down approximately one inch. By varying the length of the channels or size of the axle bearings, it is possible to define a range of positions which is larger or smaller than this range. For most ride-ons, it is expected that a range of between approximately one inch and approximately three inches will be sufficient. It should be understood, however, that the most suitable range of positions will tend to vary depending upon such factors as the size of the ride-on, the surface upon which it is intended for use, and the distance between the ride-on's drive wheels and free-floating wheel. Therefore ranges outside of those recited above are possible and within the scope of the present invention.

Figure 7:
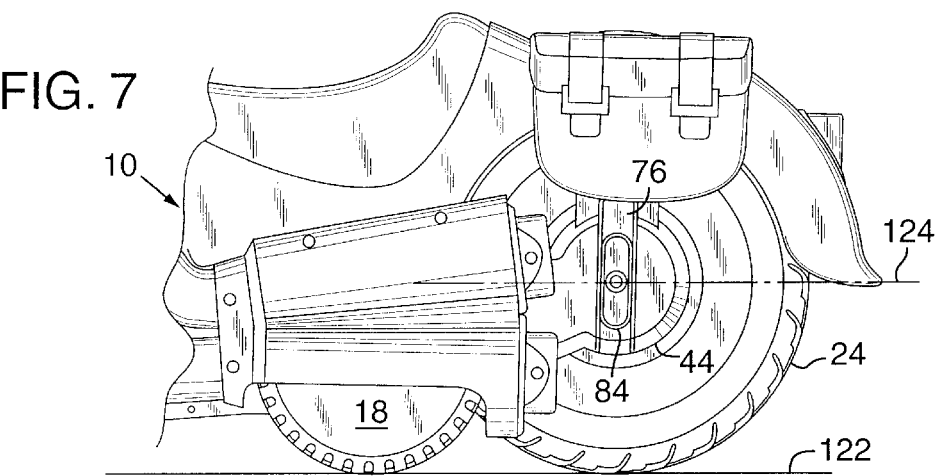
FIG. 7 is a fragmentary side elevation view of the rear portion of the ride-on of FIG. 4 on a straight surface.

In FIG. 7, ride-on 10 is shown traveling over a straight surface 122. By this it is meant that the surface on which ride-on 10 travels is planar. As shown, surface 122 is level, however it could also be inclined at an angle. In FIG. 7 it can be seen that each of the ride-on's wheels are in contact with surface 122. The position of rear wheel 24 shown in FIG. 7 will be referred to herein as a neutral or intermediate position, since wheel 24 can travel upward and downward from this position, as discussed below. In FIG. 7, the position of axle 100 is generally indicated with a line 124 extending generally parallel to surface 122. Because wheel 24 is mounted to frame 12 so that it may freely spin and travel up and down as external forces are imparted to the wheel, the frictional contact with surface 122 causes the wheel to rotate as ride-on 10 travels over surface 122. This causes wheel 24 to rotate in a direction and with a speed that corresponds with the speed and direction of ride-on 10. This also makes wheel 24 appear to be a driven wheel, although in reality it is a free-floating wheel.

Figure 8:
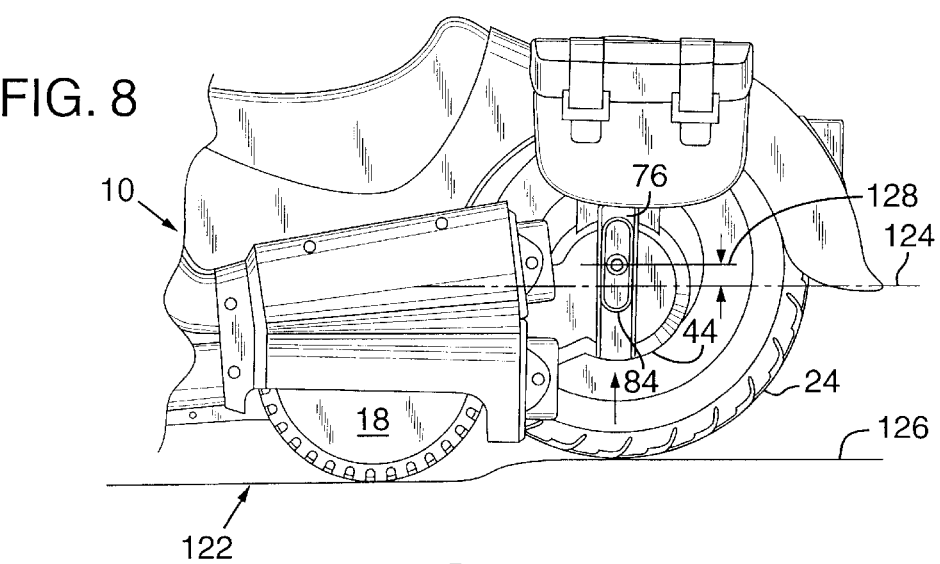
FIG. 8 is the side elevation view of FIG. 7, with the rear wheel raised from the position of FIG. 7 to accommodate travel over an uneven surface.

In FIG. 8, surface 122 is uneven. Specifically, the portion 126 of surface 122 over which wheel 24 is positioned is higher than the portions of the surface over which the ride-on's front and drive wheels 16, 18 and 20 are positioned. Because wheel 24 is not secured or biased to remain in its neutral position, the axle bearings have raised upwardly in their respective regions of the track, thereby also raising rear wheel 24 from its position shown in FIG. 7. For comparison with the position shown in FIG. 7, the position of axle 100 in this elevated position is generally indicated with line 128, and the extent to which wheel 24 has been raised can be seen by the distance between lines 124 and 128.

Because wheel 24 is a free-floating wheel and not a fixed wheel, it may deflect away from its current position when it encounters an external force, such as when ride-on 10 encounters the bump between the uneven portions of surface 122. This enables drive wheels 18 and 20 to remain in contact with surface 122. It should be understood by looking at FIG. 8 that if rear wheel 24 was not a free-floating wheel, the differences in elevation between front and rear wheels 16 and 24 would have resulted in drive wheels 18 and 20 being suspended above surface 122. Since these wheels are the ride-on's drive wheels, the vehicle would not be able to continue along its path until the user or other person freed the ride-on from its stuck position.

Figure 9:
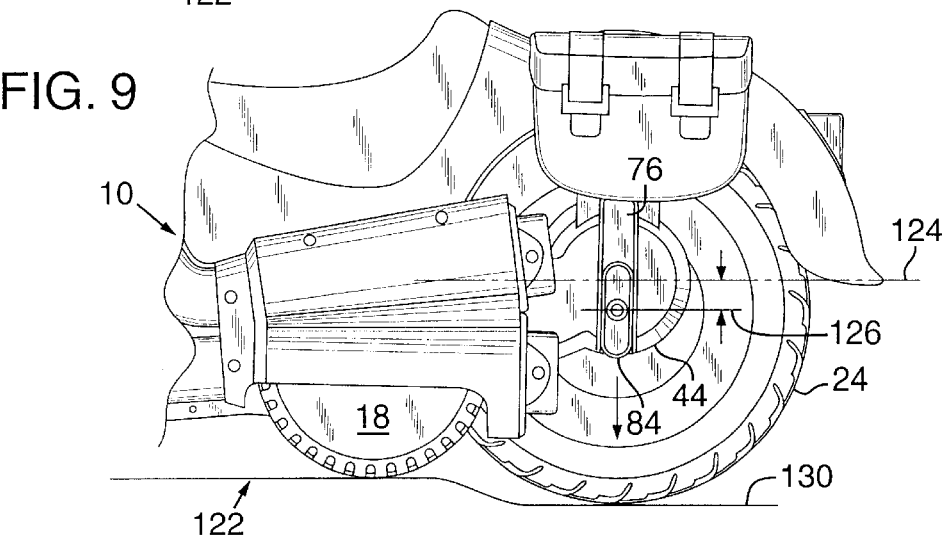
FIG. 9 is the side elevation view of FIG. 7, with the rear wheel lowered from the position of FIG. 7 to accommodate travel over another uneven surface.

On the other hand, if the portion of surface 122 is at a lower elevation than the corresponding portions of the surface over which the ride-on's front wheel travels, then the vehicle also could become stuck if wheel 24 was not a free-floating wheel. Alternatively, rear wheel 24 could be suspended above the surface. For example, in FIG. 9, surface 122 includes a depression 130 over which wheel 24 is positioned. Once suspended above this portion of the surface, the illusion of ride-on 10 being an actual two-wheeled motorcycle would be lost because the rear wheel would be elevated above the surface. However, by allowing rear wheel 24 to float within region 76 of the track, the wheel travels downward in the track to remain in contact with the surface. The position of axle 100 in FIG. 9 is indicated with a line 130, and the relative distance between this position and the position shown in FIG. 7 is shown between lines 126 and 130.

Besides the advantage of preventing the ride-on from becoming wedged or stuck in a position if the drive wheels lose contact with the surface over which the ride-on is traveling, free-floating rear wheel 24 also results in the ride-on looking more like an actual two-wheeled motorcycle because the wheel remains in contact with the ground surface at all times. This frictional contact with the surface causes the wheel to rotate about its axle, much like an actual non-driven wheel of a vehicle. Therefore, wheel 24 will spin in the direction of movement of ride-on 10 and will spin faster or slower as the speed of ride-on 10 is increased or decreased. Furthermore, because mounts 72 and 74 are configured to resemble the swing arm of an actual motorcycle, upward and downward movement of axle bearings 84 and 86 and wheel 24 as ride-on 10 travels over uneven terrain closely resembles the visual appearance of an actual motorcycle traveling over uneven terrain.

Figure 10:
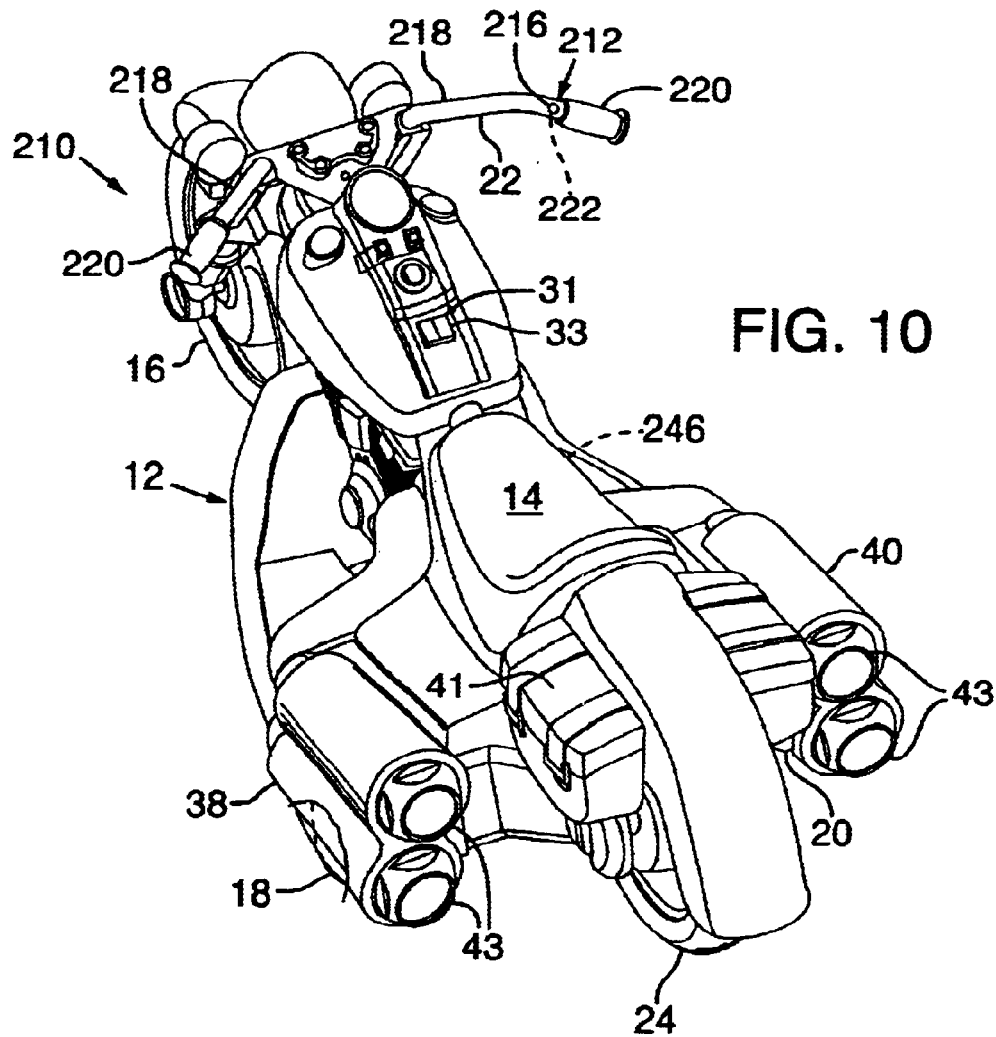
FIG. 10 is an isometric view of another children's ride-on vehicle according to the present invention.

Another embodiment of a ride-on according to the present invention is shown in FIG. 10 at 210. Similar to the previously described ride-ons, ride-on 210 generally resembles a motorcycle. Unless otherwise specified, the elements, subelements and possible variations discussed above may be included with ride-on 210. In FIG. 10, it can be seen that the ride-on includes a frame, or vehicle body, 12 with a seat 14 upon which a child operating the ride-on sits, a steering mechanism 22, and a plurality of wheels 16, 18, 20 and 24. Ride-on 210 may be formed with or without free-floating wheel 24, and with driven wheels 18 and 20 with configurations other than housed within exhaust pipes 38 and 40.

In FIG. 10, the ride-on includes a switch assembly 212 having a switch (shown in FIG. 11 at 214) and a user-manipulable portion 216 on the steering mechanism 22 of the ride-on. As shown, steering mechanism 22 takes the form of a handlebar assembly in the form of a pair of handlebars 218 having regions 220 adapted to receive the child's hands while the ride-on is being operated. Regions 220 may also be referred to as handgrips because these regions are adapted to be grasped by the child operating the ride-on to steer the ride-on. It should be understood that the handlebar assembly may include a single handlebar with a pair of handgrips, as opposed to the pair of handlebars shown in FIG. 10.

Preferably, user-manipulable portion 216 is positioned for actuation by a child without requiring the child's hands to be removed from regions 220. For example, portion 216 may be mounted on the handlebar assembly or other suitable steering mechanism at least proximate the handgrips so that the child's hands do not need to be removed from the handgrips to actuate portion 216. By "at least proximate" it is meant that portion 216 is on, adjacent, or otherwise positioned sufficiently near handgrips 220 so the child's hands can remain on the hand grips, steering wheel, or other suitable structure used to steer and control the direction of the ride-on, without a loss of control when the child selects high-speed operation of the ride-on by pressing or otherwise actuating portion 216.

Switch assembly 212 selectively configures the ride-on's drive assembly for high-speed operation. Switch 214 and corresponding portion 216 may take any suitable form, such as toggle switches, rotatable members, momentary switches, rocker switches, push-buttons, etc. In some embodiments, switch assembly 212 is configured to require constant pressure from the child to remain in the high-speed configuration. For example, the switch assembly may include a biasing mechanism, such as a spring 222, that biases the switch assembly to return to the low-speed configuration when portion 216 is released by the child. This prevents the ride-on from being inadvertently operated in the high speed configuration. In such a configuration, switch assembly 212 may be thought of as providing a "turbo switch" that a child operating the ride-on may use to provide a "boost" of power.

More particularly, when the ride-on is configured to be driven in a forward direction and the child presses portion 216, the ride-on will now travel at a higher speed than before the button was pressed.

An example of a suitable wiring diagram for ride-on 210 is shown in FIG. 11. Similar to the previously discussed ride-ons, ride-on 210 includes a drive assembly 230 that includes a motor assembly 232 and a battery assembly 234. The motor assembly includes one or more motors, and the battery assembly includes one or more batteries. For example, in FIG. 11 the drive assembly is shown including a pair of motors 236 and 238 powered by a single battery 240. It should be understood that the drive assemblies for the ride-ons discussed herein may include two motors powered by a single battery or a pair of batteries, or alternatively, may include a single motor powered by one or more batteries.

Although not required, an advantage of having more than one motor, more than one battery, or both, is that the speeds of operation of the ride-on may be varied by selectively connecting the motors or batteries between parallel and series configurations. For example, a pair of six-volt batteries will deliver six volts to a motor assembly if connected in parallel, and 12 volts if connected in series. Similarly, a battery assembly adapted to deliver 12 volts to a motor assembly that includes a pair of motors will deliver 12 volts to each motor if the motors are connected in parallel, and 6 volts to each motor if the motors are connected in series.

Also shown in FIG. 11 are switches 31, 214 and 242. Switch 31 is a reversing switch that includes a user-manipulable portion 33 (shown in FIG. 10) that enables a user to selectively change the direction the ride-on travels by reversing the polarity of the current from the battery assembly to the motor assembly. Switch 214, discussed above, is a "turbo" switch that selectively causes high-speed operation of the ride-on. Switch 242 is an on/off switch that includes a user-manipulable portion 246 that is selectively actuated by the user to complete the electrical circuit between the ride-on's motor and battery assemblies, thereby causing driven operation of the ride-on. An illustrative example of a suitable portion 246 is a foot pedal on one of the ride-on's running boards, such as shown in FIG. 10. A suitable foot pedal is disclosed in U.S. Pat. No. 5,319,996, which is hereby incorporated by reference. Other examples include a rotary grip on the ride-on's handlebars and a pushbutton, shiftable lever or the like on the ride-on's dashboard. In FIG. 11, switches 31 and 214 are shown as double-pole double-throw switches, although any suitable switch mechanism may be used. In FIG. 11, switches 214 and 242 are shown as momentary switches that are respectively biased, such as with springs, to the low-speed and off configurations.

In the diagram shown in FIG. 11, it can be seen that the drive assembly does not permit high-speed operation of the ride-on in the reverse direction. This safety feature prevents the child from being able to drive the vehicle in reverse at high speeds. In the diagram shown, power is no longer delivered to the motor assembly if high-speed, reverse operation is selected. Alternatively, the wiring harness may be configured to produce low-speed reverse operation regardless of whether high- or low-speed reverse operation is selected by the child. An example of another suitable switch assembly adapted to preclude high-speed operation of the ride-on in a reverse direction is disclosed in U.S. Pat. No. 5,644,114, which is hereby incorporated by reference.

It should be understood that the wiring diagram shown in FIG. 11 is for the purpose of illustration and that other suitable wiring diagrams, or wiring harnesses, may be used. For example, reversing switch 31 may be omitted to produce a ride-on that is driven by motor assembly 232 in one direction only. As another example, omission of speed switch 212 results in a ride-on that is driven at a single speed by motor assembly 232.

It should be understood that the above-described "turbo switch" may be used on ride-ons having configurations other than the illustrative embodiment shown in FIG. 10. For example, it may be used on battery-powered ride-ons that resemble other forms of full-sized vehicles, such as cars, trucks, off-road vehicles, aircraft, and the like, as well as battery-powered ride-ons that have unique shapes and designs. Furthermore, switch assembly 212 may be used with other types of steering mechanisms, such as steering wheels, a single handlebar, and steering levers.

For example, in FIG. 12 a ride-on is shown at 250 that includes a steering mechanism 22 in the form of a steering wheel 252. It should be understood that ride-on 250 includes any of the drive assemblies described above with respect to ride-on 210. As shown, wheel 252 includes user-manipulable portion 216 of "turbo" switch assembly 212 positioned for engagement by a child holding steering wheel 252 having user-grippable portion 254. Additional user-manipulable portions 216 are shown in dashed lines in FIG. 12 to indicate that the ride-on may include more than one user-manipulable portion 216, such as to enable a wider range of positions in which the child may grasp steering mechanism 22 and actuate at least one of the user-manipulable portions without removing the child's hands from the steering mechanism.

While the invention has been disclosed in its preferred form, the specific embodiments thereof as disclosed and illustrated herein are not to be considered in a limiting sense as numerous variations are possible. Applicants regard the subject matter of their invention to include all novel and non-obvious combinations and subcombinations of the various elements, features, functions and/or properties disclosed herein. The following claims define certain combinations and subcombinations that are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of applicants' invention.

We claim:

1. A drive assembly for a children's ride-on vehicle, the drive assembly comprising:

a motor assembly including at least one motor having a rotatable output shaft;

a battery assembly adapted to provide power to the motor assembly, wherein the battery assembly includes at least one battery;

a power switch having a first power configuration, in which an electrical circuit is completed between the motor assembly and the battery assembly, and a second power configuration, in which the electrical circuit is not completed; and a speed switch having a first speed configuration, in which the drive assembly is configured to rotate the rotatable output shaft at a first speed, and a second speed configuration, in which the drive assembly is configured to rotate the output shaft at a second speed greater than the first speed configuration, wherein the speed switch includes a biasing mechanism adapted to bias the speed switch toward the first speed configuration.

2. The assembly of claim 1, wherein the motor assembly includes a pair of motors, wherein in the first speed configuration the speed switch connects the pair of motors in series and in the second speed configuration the speed switch connects the pair of motors in parallel.

3. The assembly of claim 1, wherein the battery assembly includes a pair of batteries, wherein in the first speed configuration the speed switch connects the pair of batteries in parallel and in the second speed configuration the speed switch connects the pair of batteries in series.

4. The assembly of claim 1, further including a direction switch having a first direction configuration in which the drive assembly is adapted to rotate the output shaft in a first direction, and a second direction configuration in which the drive assembly is adapted to rotate the output shaft in a second direction opposite the first direction.

5. The assembly of claim 1 in combination with a children's ride-on vehicle having a frame having a seat adapted to receive a child, a plurality of wheels including at least one driven wheel and at least one steerable wheel, and a steering assembly coupled to the at least one steerable wheel.

6. The assembly of claim 5, wherein the speed switch includes a user-manipulable portion adapted to be engaged by a child to selectively position the speed switch between the first and second speed configurations.

7. The assembly of claim 6, wherein the steering assembly includes a steering mechanism having a region adapted to be grasped by a child to steer the vehicle.

8. The assembly of claim 7, wherein the user-manipulable portion is at least proximate the region adapted to be grasped by a child to steer the vehicle.

9. The assembly of claim 8, wherein the steering mechanism includes a handlebar.

10. The assembly of claim 8, wherein the steering mechanism includes a steering wheel.

11. The assembly of claim 7, wherein the user-manipulable portion is externally accessible and adapted for the child to actuate the switch assembly with a first hand while grasping the region of the steering mechanism with the first hand.

12. The assembly of claim 11, wherein the steering mechanism includes a handlebar.

13. The assembly of claim 11, wherein the steering mechanism includes a steering wheel.

14. The assembly of claim 5, wherein the motor assembly includes a pair of motors, wherein in the first speed configuration the speed switch connects the pair of motors in series and in the second speed configuration the speed switch connects the pair of motors in parallel.

15. The assembly of claim 5, wherein the battery assembly includes a pair of batteries, wherein in the first speed configuration the speed switch connects the pair of batteries in parallel and in the second speed configuration the speed switch connects the pair of batteries in series.

16. The assembly of claim 5, further including a direction switch having a first direction configuration in which the drive assembly is adapted to rotate the output shaft in a first direction, and a second direction configuration in which the drive assembly is adapted to rotate the output shaft in a second direction opposite the first direction.

17. The assembly of claim 11, wherein the user-manipulable portion includes a push button.

18. The assembly of claim 8, wherein the steering mechanism includes a handlebar assembly with at least one handgrip, wherein the region adapted to be grasped by the child is a handgrip on the handlebar assembly, and further wherein the user-manipulable portion is externally accessible and adapted for the child to actuate the switch assembly with a first hand while grasping the handgrip with the first hand.

19. The assembly of claim 18, wherein the user-manipulable portion includes a push button.

20. The assembly of claim 8, wherein the steering mechanism includes a steering wheel assembly with at least one handgrip, wherein the region adapted to be grasped by the child is a handgrip on the steering wheel assembly, and further wherein the user-manipulable portion is externally accessible and adapted for the child to actuate the switch assembly with a first hand while grasping the handgrip with the first hand.

21. The assembly of claim 20, wherein the user-manipulable portion includes a push button.

22. The assembly of claim 11, wherein the at least one driven wheel is adapted to be rotationally driven by the rotational output shaft of the motor assembly.

23. The assembly of claim 22, wherein the at least one steerable wheel is a front wheel and wherein the at least one driven wheel is positioned on the body rearward of the front wheel.

24. The assembly of claim 23, wherein the plurality of wheels further includes a non-driven wheel that is positioned on the body rearward of the at least one driven wheel.

25. A children's ride-on vehicle, comprising:

a frame;

a plurality of wheels, including at least one driven wheel adapted to be rotationally driven by a drive assembly and at least one steerable wheel adapted to be selectively steered by a child;

a steering assembly including a steering mechanism coupled to the at least one steerable wheel, wherein the steering mechanism includes at least one region adapted to be grasped by the child to steer the at least one steerable wheel;

a drive assembly having a motor assembly adapted to drive the at least one driven wheel and a battery assembly adapted to power the motor assembly;

a switch assembly including a user-manipulable portion mounted on the steering assembly at least proximate the at least one region adapted to be grasped by the child, wherein the drive assembly has a first configuration adapted to drive the at least one driven wheel at a first selected speed, and upon actuation of the switch assembly the drive assembly is configured to a second configuration adapted to drive the at least one driven wheel at a second selected speed that is greater than the first selected speed; and a free-floating wheel coupled to the frame and rotatable about an axle, wherein the frame includes a track within which the axle travels, and further wherein the track defines upper and lower limits within which the at least one steerable wheel travels as external forces are imparted to the at least one steerable wheel.

26. The vehicle of claim 25, wherein the user-manipulable portion is externally accessible and adapted for the child to actuate the switch assembly with a first hand while grasping the at least one region of the steering mechanism with the first hand.

27. The vehicle of claim 25, wherein the motor assembly includes a pair of motors, wherein in the first configuration the pair of motors are connected to the battery assembly in series, and further wherein in the second configuration the pair of motors are connected to the battery assembly in parallel.

28. The vehicle of claim 25, wherein the steering mechanism includes a handlebar assembly.

29. The vehicle of claim 28, wherein the at least one region adapted to be grasped by the child is a handgrip on the handlebar assembly, and further wherein the user-manipulable portion is mounted at least proximate the handgrip.

30. The vehicle of claim 25, wherein the steering mechanism includes a steering wheel that includes the at least one region adapted to be grasped by the child.

31. The vehicle of claim 30, wherein the user-manipulable portion is mounted on the steering wheel.

32. The vehicle of claim 28, wherein the at least one region adapted to be grasped by the child is a handgrip on the handlebar assembly, and further wherein the user-manipulable portion is externally accessible and adapted for the child to actuate the switch assembly with a first hand while grasping the handgrip with the first hand.

33. The vehicle of claim 25, wherein the user-manipulable portion is adjacent the at least one region adapted to be grasped by the child.

34. The vehicle of claim 25, wherein the switch assembly includes a biasing mechanism adapted to bias the user-manipulable portion toward an unactuated position in which the drive assembly is in the first configuration.

\* \* \* \* \*